United States Patent
Lee et al.

(10) Patent No.: US 11,241,940 B2
(45) Date of Patent: Feb. 8, 2022

(54) THERMAL MANAGEMENT SYSTEM FOR VEHICLE

(71) Applicant: HANON SYSTEMS, Daejeon (KR)

(72) Inventors: Hae Jun Lee, Daejeon (KR); Jeong Hoon Lee, Daejeon (KR); Yong Nam Ahn, Daejeon (KR); Sung Je Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 315 days.

(21) Appl. No.: 16/095,735

(22) PCT Filed: Nov. 21, 2017

(86) PCT No.: PCT/KR2017/013233
§ 371 (c)(1),
(2) Date: Oct. 23, 2018

(87) PCT Pub. No.: WO2018/105925
PCT Pub. Date: Jun. 14, 2018

(65) Prior Publication Data
US 2021/0221199 A1     Jul. 22, 2021

(30) Foreign Application Priority Data
Dec. 7, 2016 (KR) .................. 10-2016-0165952

(51) Int. Cl.
*B60H 1/32* (2006.01)
*B60H 1/00* (2006.01)

(52) U.S. Cl.
CPC ....... *B60H 1/3228* (2019.05); *B60H 1/00271* (2013.01)

(58) Field of Classification Search
CPC .... B60H 1/3228; B60H 1/00271; B60H 1/00; B60H 1/14; B60H 1/22; B60H 1/32;
(Continued)

(56) References Cited

U.S. PATENT DOCUMENTS 7,841,431 B2   11/2010   Zhou
8,215,432 B2 *   7/2012   Nemesh ............. B60H 1/00278
                                        180/68.2
(Continued)

FOREIGN PATENT DOCUMENTS

JP    2013075628 A   *   4/2013
JP    5831108 32      12/2015
(Continued)

OTHER PUBLICATIONS

International Search Report and Written Opinion dated Feb. 21, 2018 from corresponding International Patent Application No. PCT/KR2017/013233 with English translation of International Search Report.

*Primary Examiner* — Frantz F Jules
*Assistant Examiner* — Martha Tadesse
(74) *Attorney, Agent, or Firm* — Dickinson Wright PLLC (57) ABSTRACT

The present invention relates to a vehicle thermal management system which comprises multiple means of thermal management for electronic components (electronic units) for an autonomous vehicle and allows for efficient interworking between the multiple means. The vehicle thermal management system, which is a system for cooling electronic components required for the autonomous driving of a vehicle, is configured to cool electronic components by applying at least two systems among a first system for cooling the electronic components through the cooling structure thereof, a second system for cooling the electronic components by using a refrigerant cycle for air-conditioning a vehicle interior, and a third system for cooling the electronic components by using a separate refrigerant or a coolant cycle.

15 Claims, 7 Drawing Sheets

(58) Field of Classification Search
CPC ..... B60H 1/00007; B60K 11/02; B60R 16/03; F28D 2021/004
See application file for complete search history.

(56) References Cited

U.S. PATENT DOCUMENTS

| | | | |
|---|---|---|---|
| 8,910,489 B2* | 12/2014 | Choi | B60H 1/143 62/160 |
| 9,863,672 B2* | 1/2018 | Goenka | B60H 1/00478 |
| 2002/0027027 A1* | 3/2002 | Skala | B60L 58/33 180/65.22 |
| 2002/0040896 A1* | 4/2002 | Ap | B60L 3/0046 219/208 |
| 2003/0193009 A1* | 10/2003 | Dill | B60L 1/003 250/206 |
| 2005/0133215 A1* | 6/2005 | Ziehr | B60H 1/143 165/202 |
| 2005/0241865 A1* | 11/2005 | Varenne | B60L 3/003 180/65.1 |
| 2020/0180391 A1* | 6/2020 | Kim | B60H 1/32284 |
| 2021/0094389 A1* | 4/2021 | Li | B60H 1/00735 |

FOREIGN PATENT DOCUMENTS

| | | | |
|---|---|---|---|
| JP | 5831108 B2 | 12/2015 | |
| KR | 20040072247 A | 8/2004 | |
| KR | 20120129076 A | * 11/2012 | |
| KR | 20120129076 A | 11/2012 | |
| KR | 20160087001 A | 7/2016 | |
| WO | WO-2018105928 A1 * | 6/2018 | ............... B60H 1/00 |

* cited by examiner

THERMAL MANAGEMENT SYSTEM FOR VEHICLE

CROSS-REFERENCE TO RELATED APPLICATIONS

This application is a U.S. National Stage of International Application No. PCT/KR2017/013233, filed Nov. 21, 2017, which claims the benefit and priority of KR 10-2016-0165952 filed Dec. 7, 2016. The entire disclosures of each of the above applications are incorporated herein by reference.

TECHNICAL FIELD

The present invention relates to a thermal management system for a vehicle, and more particularly, to a thermal management system for a vehicle capable of cooling or heating electronic devices for an autonomous system.

BACKGROUND ART

In general, an autonomous system for a vehicle includes electronic devices, such as a lidar, a radar, a sensor, and so on. For autonomous driving of the vehicle, a series of thermal managements for cooling or heating electric parts including the electronic devices are essentially demanded.

In the meantime, U.S. Pat. No. 7,841,431 (Nov. 30, 2010) discloses a thermal management system for a vehicle including power train cooling subsystem, a refrigeration subsystem, a battery cooling subsystem, and a heating, ventilation and cooling (HVAC) subsystem.

A conventional thermal management system for a vehicle includes a cooling subsystem, an HVAC subsystem having a first refrigerant loop having a heating means and a cooling means, a power train cooling subsystem having a second refrigerant loop having a radiator, and a means for connecting the first refrigerant loop and the second refrigerant loop with each other to control them.

Refrigerant flows in the first refrigerant loop, and an electro-compressor, a condenser, an expansion valve, and a chiller are disposed on the first refrigerant loop in a flow direction of the refrigerant in order. The electro-compressor inhales and compresses the refrigerant, and then, discharges out in a gaseous state of high temperature and high pressure. The condenser exchanges heat between the refrigerant and the air blown from a blower. The expansion valve is arranged between the condenser and the chiller to expand the refrigerant.

The chiller exchanges heat between refrigerant of low temperature and low pressure expanded in the expansion valve and coolant of a coolant line.

Moreover, coolant flows inside the second refrigerant loop, and the second refrigerant loop cools or heats a power transmission means, such as a motor. The coolant circulated and induced after being heat-exchanged with the motor flows toward a heat storing unit after passing a low temperature radiator (LTR) or flows toward the heat storing unit after being heat-exchanged with the refrigerant to be cooled while passing the chiller. The coolant line has a water pump for circulating the coolant.

When the conventional thermal management system breaks down, it cannot cool a heat source unit stably and continuously, and it may make autonomous driving impossible in case that the thermal management system is applied to an autonomous vehicle. In the worst case, it causes a breakdown in autonomous driving to cause an accident.

DISCLOSURE

Technical Problem

Accordingly, the present invention has been made in view of the above-mentioned problems occurring in the prior art, and it is an object of the present invention to provide a thermal management system for a vehicle capable of providing an effective interlock among a plurality of means for performing thermal management of electronic components, such as electronic devices, for an autonomous vehicle.

Technical Solution

To accomplish the above object, according to the present invention, there is provided a thermal management system for a vehicle for cooling electronic components required for autonomous driving of the vehicle, including: a first system for cooling the electronic components through a self-cooling structure thereof; a second system for cooling the electronic components by using a refrigerant cycle for air-conditioning the interior of the vehicle; and a third system for cooling the electronic components by using a refrigerant cycle or a coolant cycle, wherein the electronic components are cooled by at least two systems among the first, second and third systems.

Moreover, thermal management of the electronic components is performed by the first system and the third system.

Furthermore, thermal management of the electronic components is performed by the first system and the second system.

Additionally, coolant circulating the electronic components is cooled using a cooling heat source of the second system, and the third system and the second system interlock with each other to selectively cool the coolant circulating the electronic components.

In addition, the second system aids the self-cooling system and the third system to selectively cool the coolant circulating the electronic components.

Moreover, the thermal management system further includes: a sensing means for sensing states of at least two systems selected among the first system, the second system, and the third system; and a communication means for performing communication between at least two systems selected among the first system, the second system, and the third system.

Furthermore, when the sensing means senses that one among the at least two systems selected among the first system, the second system, and the third system, the other system compensates it to perform thermal management of the electronic components.

Additionally, the state of the system sensed by the sensing means is temperature information.

In addition, the thermal management system further includes: a temperature control head for sensing the state of the second system and controlling the operation of the second system; and a stand-alone controller for sensing the state of the third system and controlling the operation of the third system, wherein sensing lines of the temperature control head and the stand-alone controller interlock with each other.

Moreover, the first system cools the electronic components using at least one among radiation of heat, conduction, and convection current.

Furthermore, the third system includes: a first refrigerant line which is a flow passage of refrigerant; a first compressor for discharging the refrigerant in a gaseous state of high temperature and high pressure after inhaling and compressing the refrigerant; a first condenser for condensing the refrigerant by exchanging heat with the air; a first expansion valve for expanding the refrigerant; a first chiller for exchanging heat between the refrigerant and the coolant; and a first coolant line which is a flow passage of the coolant exchanging heat with the electronic components and passes through the first chiller.

Additionally, the third system further comprises a heater disposed in the first coolant line to heat the coolant.

In addition, the third system further includes: a first branch line branching off from the first coolant line and bypassing the first chiller; and a first low-temperature radiator disposed in the first branch line to exchange heat between the air and the coolant.

Moreover, the second system includes: a second refrigerant line which is a flow passage of the refrigerant; a second compressor for discharging the refrigerant in a gaseous state of high temperature and high pressure after inhaling and compressing the refrigerant; a second condenser for condensing the refrigerant by exchanging heat with the air; an expansion means for expanding the refrigerant; an evaporator disposed inside an air-conditioning case to exchange heat between the refrigerant and the air discharged to the interior of the vehicle; a third refrigerant line bypassing the evaporator; a second chiller disposed in the third refrigerant line to exchange heat between the refrigerant and the coolant; and a second coolant line, which is a flow passage of the coolant exchanging heat with the electronic components and passes the second chiller.

Furthermore, the second system further includes: a second branch line branching off from the second coolant line and bypassing the second chiller; and a second low-temperature radiator disposed in the second branch line to exchange heat between the air and the coolant.

Additionally, the thermal management system includes: a first coolant line arranged in the third system; a second coolant line arranged in the second system; a third coolant line, which is connected to the first coolant line and the second coolant line and is a flow passage of the coolant exchanging heat with the electronic components; and a dual cooling valve for selectively connecting the third coolant line to the first coolant line and the second coolant line.

Advantageous Effects

As described above, the thermal management system for a vehicle according to the present invention, which can continuously cool the autonomous system even if one of the cooling systems breaks down, and minimize power consumption of the compressor by simultaneously cooling the electronic components and the battery of the autonomous vehicle through the conventional air-conditioning system if there is no cooling load indoors, thereby contributing to improvement of the mileage of the vehicle.

Moreover, in case of excessive heat generation and cooling load of the electronic components, the thermal management system for a vehicle according to the present invention can operate the third system and the second system at the same time to satisfy required cooling performance, and can control the third system and the second system optimally in consideration of indoor environment, the battery, and the load of the electronic components of the autonomous vehicle.

Furthermore, the thermal management system for a vehicle according to the present invention can prevent the worst case through the cooling structure of the self-cooling system even if all of the independent system and the conventional system, which are operated by refrigerant, thereby enhancing stability in autonomous running.

MODE FOR INVENTION

Hereinafter, a technical structure of a thermal management system for a vehicle according to the present invention will be described in detail with reference to the accompanying drawings.

Figure 1:
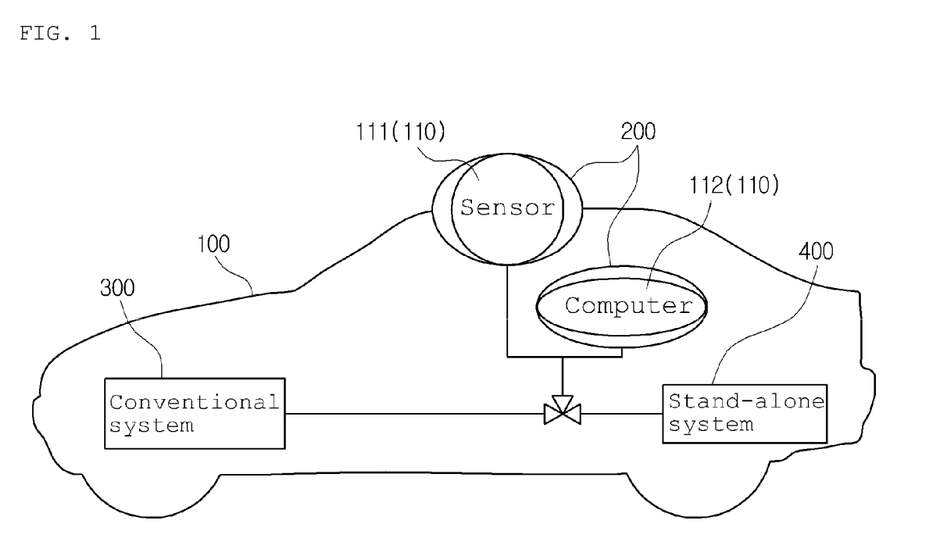
FIG. 1 is a schematic diagram of a thermal management system for a vehicle according to an embodiment of the present invention.
Figure 2:
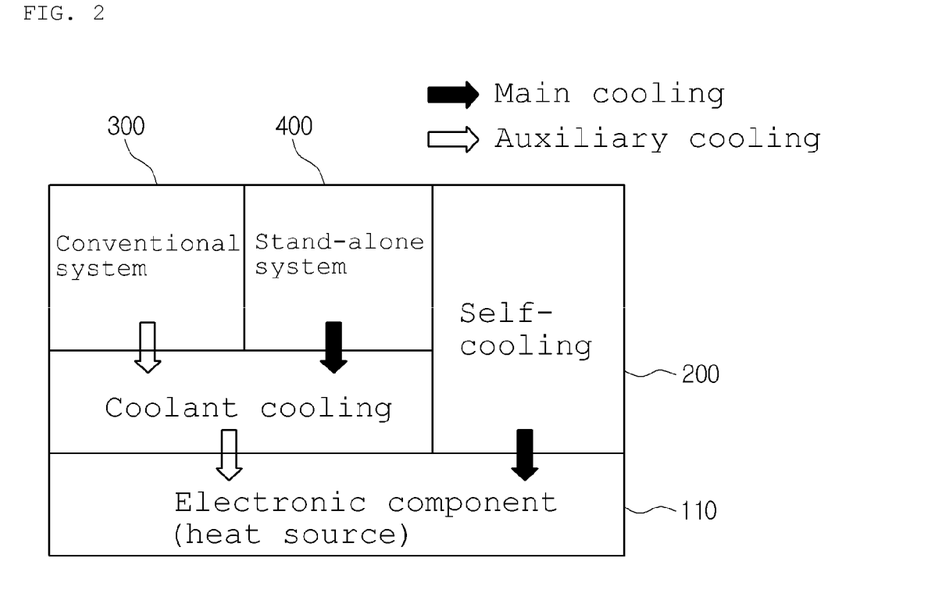
FIG. 2 is a view showing a cooling method of the thermal management system for the vehicle according to the embodiment of the present invention.
Figure 3:
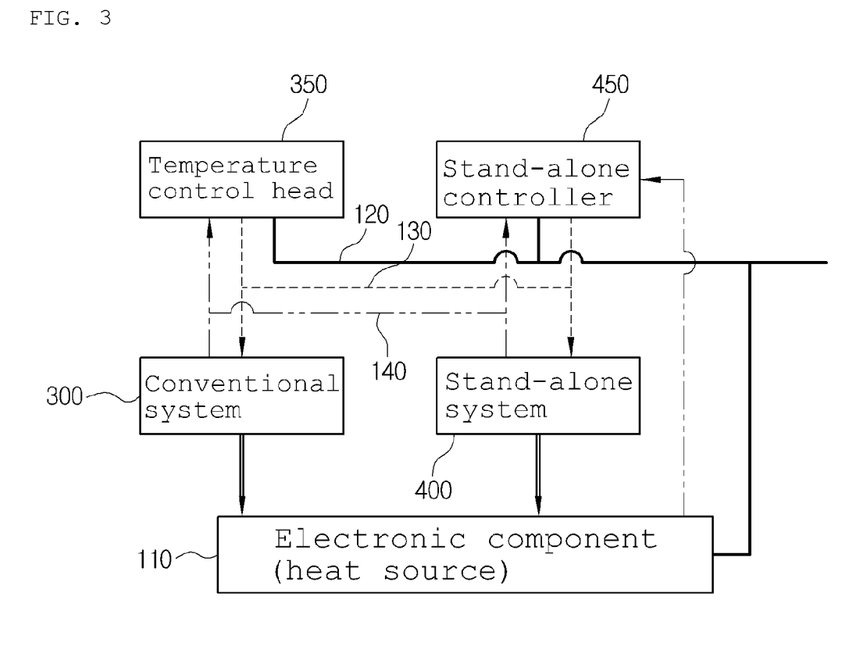
FIG. 3 is a configurative view showing a control unit of the thermal management system for the vehicle according to the embodiment of the present invention.

FIG. 1 is a schematic diagram of a thermal management system for a vehicle according to an embodiment of the present invention, FIG. 2 is a view showing a cooling method of the thermal management system for the vehicle according to the embodiment of the present invention, and FIG. 3 is a configurative view showing a control unit of the thermal management system for the vehicle according to the embodiment of the present invention.

As shown in FIGS. 1 to 3, the thermal management system for the vehicle according to the embodiment of the present invention is to perform a series of thermal managements to cool or heat electronic components including electronic devices 110, such as a computer 112, a lidar, a radar, and a sensor 111 of an autonomous vehicle 100, and includes a first system 200 which is a first module, a second system 300 which is a second module, and a third system 400 which is a third module.

The first system 200 is a self-cooling system to cool the electronic components 110 of the autonomous vehicle through a self-cooling structure. The first system 200 cools the electronic components 110 using at least one among radiation of heat, conduction, and convection current, and cools the electronic components 110 through the mechanical self-cooling structure without having a power source, for instance, an electro-compressor (refrigerant cycle).

The second system 300 is a conventional system, and cools the electronic components 110 necessary for autonomous running of the vehicle using a refrigerant cycle, which performs air-conditioning of the interior of the vehicle. For instance, the second system 300 includes a heating means and a cooling means to perform air-conditioning of the interior of the vehicle, and has an HVAC structure performing heating, ventilation and cooling. The second system 300 includes a blowing means disposed at one side for selectively inducing outdoor air and indoor air, and units for heating or cooling the outdoor air and the indoor air and discharging the cooled or heated air to the interior of the vehicle. Additionally, the refrigerant cycle of the second system 300 serves to recover waste heat of a heat source part, such as a battery of the vehicle.

The cooling means may be an evaporator using refrigerant, and the heating means may be a heater core or a PTC heater using coolant cooling an engine in case of an internal combustion engine vehicle. In addition, the second system may have a structure for cooling the battery of an electric vehicle.

The third system 400 is a stand-alone system, cools or heats coolant circulating the electronic components 110, and disposed separately from the second system 300 to independently perform cooling and heating. The third system 400 cools and heats the coolant, and performs thermal management of the electronic components 110 using the heat source.

Basically, the electronic components 110 of the autonomous vehicle performs cooling through the self-cooling structure of the first system 200. If self-cooling of the first system 200 is impossible or the first system 200 is lacking in self-cooling due to excessive heat generation of the electronic components 110, the coolant chilled through the third system 400 is supplied to the electronic components 110 to perform cooling.

The second system 300 has a cooling heat source, such as a chiller, which will be described later, and can cool the coolant circulating the electronic components 110 using the cooling heat source. Detailed description of the second system 300 will be given later.

The third system 400 and the second system 300 interlock with each other to selectively cool the coolant circulating the electronic components 110. The second system 300 aids the first system 200 and the third system 400 to selectively cool the coolant circulating the electronic components 110.

As shown in FIG. 3, the thermal management system according to the embodiment of the present invention performs main cooling of the electronic components 110, which are heat sources, only using the self-cooling system 200. More preferably, the thermal management system performs main cooling using the first system 200 and the third system 400. The second system 300 basically performs cooling and heating of the interior of the vehicle, and also performs auxiliary cooling to complement the first system 200 and the third system 400.

In other words, if the third system 400 breaks down and temperature of the coolant rises, the thermal management system senses and determines whether or not the third system 400 is out of order and operates the chiller of the second system 300 so as to cool the electronic components 110 of the vehicle. As described above, the thermal management system for the vehicle according to the embodiment of the present invention has such a dual cooling structure to perform cooling doubly.

The thermal management system for the vehicle according to the embodiment of the present invention may have four types of cooling modes.

A first mode is to perform cooling of the electronic components 110 only using the self-cooling system 200. The first mode may be applied in surroundings that there is a small amount of heat generation of the electronic components 110. The first mode contributes to enhancement of fuel efficiency of the vehicle because additional driving power is not used. A second mode is to perform cooling of the electronic components 110 using the first system 200 and the third system 400. The second mode is the basic cooling mode, and is recommended in normal surroundings.

A third mode is to perform cooling of the electronic components 110 using the first system 200 and the second system 300. The third mode is a cooling mode applied in case of emergency. If the third system 400 breaks down, the second system 300 is used to continue cooling of the electronic components 110.

A fourth mode is to perform cooling of the electronic components 110 using all of the first system 200, the second system 300 and the third system 400. The fourth mode may be applied in surroundings that there is a large amount of heat generation of the electronic components 110.

Referring to FIG. 3, the thermal management system for the vehicle according to the embodiment of the present invention includes a sensing means and a communication means. The sensing means senses states of at least two systems selected among the first system 200, the third system 400, and the second system 300. In this case, the state of the system sensed by the sensing means may be temperature information or other information, such as humidity, electric current, voltage, and so on. The communication means provides communication between at least two systems selected among the first system 200, the third system 400, and the second system 300.

The thermal management system senses breakdown of the at least two systems selected among the first system 200, the third system 400, and the second system 300. If one if the systems breaks down, the thermal management system determines it and controls in such a way that the rest among the systems compensates it so as to continuously and stably perform thermal management of the electronic components 110.

The thermal management system for the vehicle according to the embodiment of the present invention includes a temperature control head 350 and a stand-alone controller 450. The temperature control head 350 senses the state of the second system 300 and controls operation of the second system 300. The stand-alone controller 450 senses the state of the third system 300 and controls operation of the third system 400. Sensing lines 140 of the temperature control head 350 and the stand-alone controller 450 interlock with each other.

The temperature control head 350 and the stand-alone controller 450 are connected with each other to communicate with each other through the communication means so as to demand operation of each other when cooling of the electronic components is required. The temperature control head 350 controls operation of the second system 300, and the stand-alone controller 450 controls operation of the third system 400. The dotted lines in FIG. 3 indicate actuator lines 130 of the temperature control head 350 and the stand-alone controller 450, which are connected and interlocked with each other.

Moreover, the two-dot dashed lines in FIG. 3 indicate the sensing lines 140, and are used as a basis to decide whether or not the first system 200, the second system 300, and the third system 400 break down after sensing the states of the systems 200, 300 and 400.

The communication means is the communication line 120 illustrated as a solid line in FIG. 3. The communication line 120 may be controller area network (CAN) communication, hard wire (H/W) communication, or others, and has at least double lines, so that if one among the lines breaks down, the other communication line is serviceable.

Figure 4:
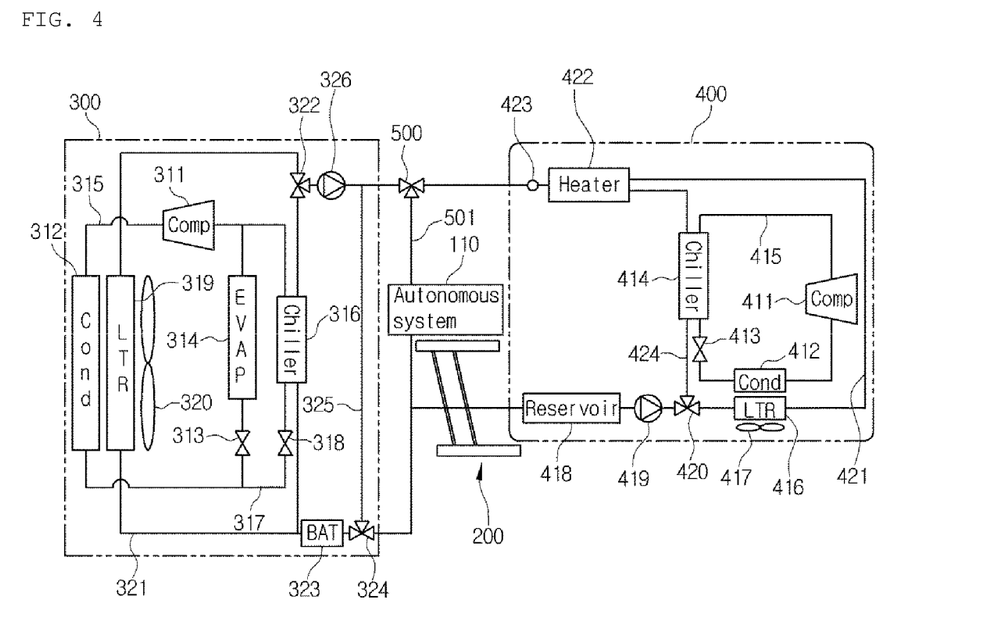
FIG. 4 is a view showing the thermal management system for the vehicle according to the embodiment of the present invention.
Figure 5:
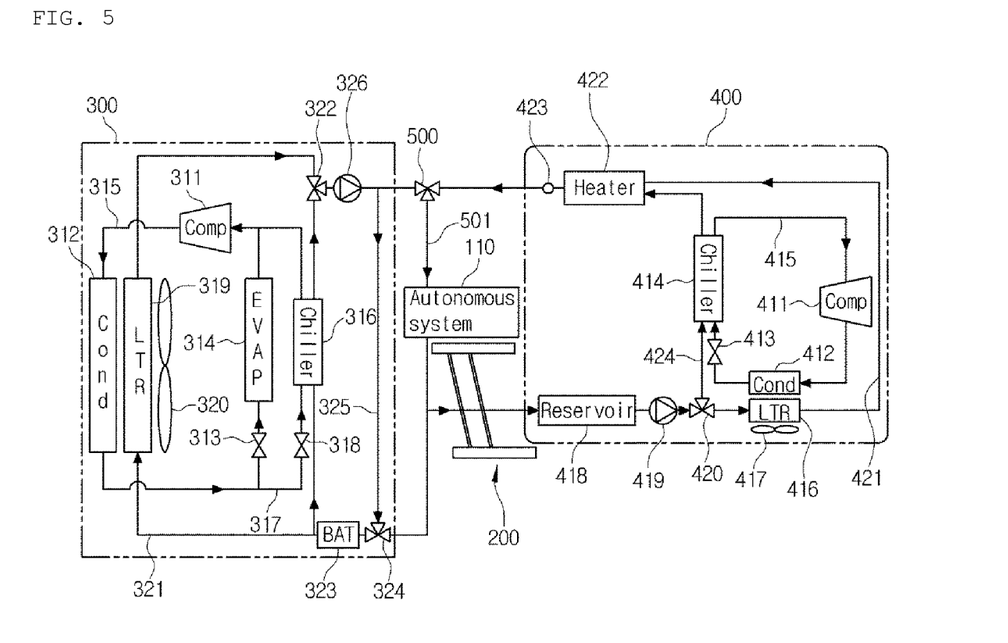
FIGS. 5 to 7 are views showing examples of operations of the thermal management system for the vehicle according to the embodiment of the present invention.
Figure 6:
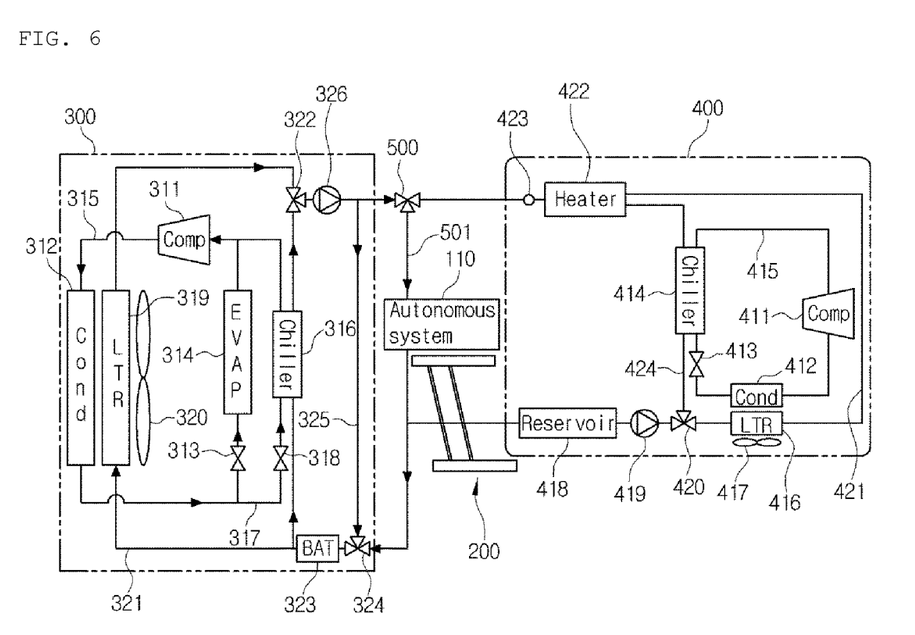
Figure 7:
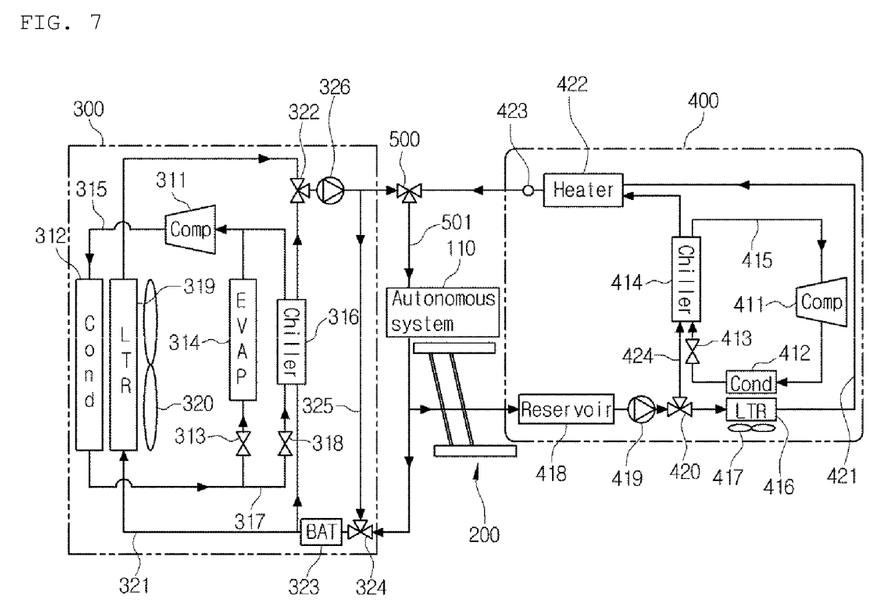

FIG. 4 is a view showing the thermal management system for the vehicle according to the embodiment of the present invention, and FIGS. 5 to 7 are views showing examples of operations of the thermal management system for the vehicle according to the embodiment of the present invention.

Referring to FIG. 4, the third system 400 includes: a first refrigerant line 415 which is a flow passage of refrigerant; a first compressor 411, a first condenser 412 for condensing the refrigerant by exchanging heat between the refrigerant and the air; a first expansion valve 413 for expanding the refrigerant; a first chiller 414 for exchanging heat between the refrigerant and coolant, and a first coolant line 424.

The first compressor 411 inhales and compresses the refrigerant, and then, discharges out the refrigerant in a gaseous state of high temperature and high pressure. Preferably, the first compressor 411 is an electro-compressor. The first condenser 412 exchanges heat between the air blown from a first blower 417 and the refrigerant of high temperature and high pressure discharged from the first compressor 411.

The first expansion valve 413 is arranged between the first condenser 412 and the first chiller 414 to expand the refrigerant. The first chiller 414 exchanges heat between the refrigerant of low temperature and low pressure expanded in the first expansion valve 413 and the coolant of the first coolant line 424. The first coolant line 424 is a flow passage of the coolant heat-exchanged with the electronic components 110, and passes the first chiller 414.

A heater 422 for heating the coolant is disposed in the first coolant line 424. The heater 422 may be an electric heater operated by electricity or may be one of various forms. In this embodiment, cooling of the electronic components is mainly described, but electronic components require not only cooling but also temperature control for maintaining optimal temperature, preheating, and heating. The heater 422 raises temperature of the coolant to make temperature control of the electronic components possible.

Furthermore, the first coolant line 424 includes a heat reservoir 418 for storing a heat source for cooling or a heat source for heating, a first water pump 419 for circulating the coolant, and a coolant temperature sensor 423 for sensing temperature of the coolant.

Additionally, the third system 400 includes a first branch line 421, a first low-temperature radiator 416, and a first valve 420. The first branch line 421 branches off from the first coolant line 424 and bypasses the first chiller 414. The first low-temperature radiator 416 is disposed on the first branch line 421 and exchanges heat between the coolant and the air blown from the first blower 417.

The first valve 420 is disposed at a branch point between the first coolant line 424 and the first branch line 421, and controls a flow of the coolant so that the coolant circulating through the electronic components 110 selectively flows to at least one among the first chiller 414 and the first low-temperature radiator 416. The first valve 420 may allow the coolant to flow to one among the first chiller 414 and the first low-temperature radiator 416 or to flow to all of the first chiller 414 and the first low-temperature radiator 416. The coolant of high temperature, which recovered waste heat while circulating through the electronic components 110 is cooled while passing the first chiller 414.

The second system 300 includes a second refrigerant line 315, a second compressor 311, a second condenser 312 for condensing the refrigerant by exchanging heat between the refrigerant and the air; an expansion means for expanding the refrigerant; an evaporator 314; a third refrigerant line 317 bypassing the evaporator 314; a second chiller 316, and a second coolant line 325.

The second compressor 311 inhales and compresses the refrigerant, and then, discharges out the refrigerant in a gaseous state of high temperature and high pressure. The second condenser 312 exchanges heat between the air blown from a second blower 320 and the refrigerant of high temperature and high pressure discharged from the second compressor 311.

The expansion means is to expand the refrigerant, and includes a second expansion valve 313 and a third expansion valve 318. The second expansion valve 313 is arranged between the second condenser 320 and the evaporator 314 to expand the refrigerant. The third expansion valve 318 is arranged between the second condenser 320 and the second chiller 316 to expand the refrigerant.

The evaporator 314 is disposed inside an air-conditioning case to exchange heat between the refrigerant and the air discharged to the interior of the vehicle. Besides the evaporator, heating means, such as a heater core or a PTC heater, a temperature-adjusting door, blowing means for inducing indoor air or outdoor air, and so on may be disposed inside the air-conditioning case.

The third refrigerant line 317 branches off from the second refrigerant line 315 and bypasses the evaporator 314. That is, the refrigerant passing through the second condenser 312 passes the evaporator 314 after passing the second expansion valve 313 or passes the second chiller 316 after passing the third expansion valve 318. Finally, the evaporator 314 and the second chiller 316 are arranged in the refrigerant line in parallel. A valve (not shown) for controlling the flow of the refrigerant may be disposed at a branch point between the third refrigerant line 317 and the second refrigerant line 315.

The second chiller 316 is disposed in the third refrigerant line 317, and exchanges heat between the refrigerant of low temperature and low pressure expanded in the third expansion valve 318 and the coolant of the second coolant line 325. The second coolant line 325 is a flow passage of the coolant heat-exchanged with the electronic components 110, and passes through the second chiller 316. A second water pump 326 for circulating the coolant is disposed in the second coolant line 325.

Moreover, the second system 300 includes a second branch line 321, a second low-temperature radiator 319, a second valve 322, and a third valve 324. The second branch line 321 branches off from the second coolant line 325, and bypasses the second chiller 316. The second low-temperature radiator 319 is disposed in the second branch line 321, and exchanges heat between the air blown from the second blower 320 and the coolant.

Furthermore, the thermal management system for the vehicle according to the embodiment of the present invention further includes a third coolant line 501 and a dual cooling valve 500. The first coolant line 424 is arranged in the third system 400, and the second coolant line 325 is arranged in the second system 300. The third coolant line 501 is connected to the first coolant line 424 and the second coolant line 325, and is a flow passage of the coolant heat-exchanged with the electronic components 110. The dual cooling valve 500 selectively connects the third coolant line 501 to the first coolant line 424 and the second coolant line 325. The first valve 420, the second valve 322, the third valve 324, and the dual cooling valve 500 may be three-way valves.

FIG. 5 shows the second mode for performing thermal management using the first system 200 and the third system 400. Referring to FIG. 5, the first system 200 performs cooling of the electronic components 110 through the self-cooling structure.

Now, the operation of the third system 400 will be described. The refrigerant discharged from the first compressor 411 flows along the first refrigerant line 415 while passing the first condenser 412, the first expansion valve 413 and the first chiller 414 in order.

Moreover, the coolant flowing in the third coolant line 501 recovers waste heat by exchanging heat with the electronic components 110, and passes the heat reservoir 418 through the first coolant line 424. After that, by the first valve 420, some of the coolant flows to the first chiller 414, and the rest flows to the first low-temperature radiator 416 along the first branch line 421 to be cooled.

The coolant passing through the first chiller 414 is cooled by exchanging heat with the refrigerant of low temperature and low pressure passing the first expansion valve 413, and then, meets the coolant passing through the first low-temperature radiator 416. After that, the coolant passes through the heater 422. In this case, the heater 422 is in an OFF state. After that, the coolant circulates to the third coolant line 501 through the dual cooling valve 500.

In the meantime, the second system 300 performs air-conditioning of the interior of the vehicle and cooling of the battery regardless of cooling of the electronic components performed by the third system 400.

That is, in the second system 300, the refrigerant discharged from the second compressor 411 flows along the second refrigerant line 315 while passing the second condenser 312, the second expansion valve 313 and the evaporator 314 in order. In this case, some of the refrigerant passing through the second condenser 312 flows to the evaporator 314, and the rest flows to the second chiller 316 along the third refrigerant line 317 after passing the third expansion valve 318.

Furthermore, the coolant, which recovered waste heat after exchanging heat with a battery 323 of the vehicle is cooled by exchanging heat with the refrigerant of low temperature and low pressure by the third expansion valve 318 while passing through the second chiller 316 along the second coolant line 325. In this case, some of the coolant passing the battery 323 flows toward the second chiller 316, and the rest flows to the second low-temperature radiator 319 along the second branch line 321 to be cooled, and then, flows to the second coolant line 325 by the second valve 322 to be circulated.

The coolant circulates to the second coolant line 325 after passing the second chiller 316 passes the second water pump 326 by the second valve 322, and then, circulates the battery 323 by the third valve 324. In this instance, the dual cooling valve 500 and the third valve 324 block the communication between the second coolant line 325 and the third coolant line 501 to prevent a flow of the coolant between the second coolant line 325 and the third coolant line 501.

FIG. 6 shows the third mode for performing thermal management using the first system 200 and the second system 300. Referring to FIG. 6, the first system 200 performs cooling of the electronic components 110 through the self-cooling structure. Moreover, the third system 400 stops operation due to breakdown or for other reasons.

Now, the operation of the second system 300 will be described. The refrigerant discharged from the second compressor 311 flows along the second refrigerant line 315 while passing the second condenser 312, the second expansion valve 313 and the evaporator 314 in order. In this instance, some of the refrigerant passing the second condenser 312 flows to the evaporator 314, and the rest flows to the second chiller 316 after passing the third expansion valve 318 along the third refrigerant line 317.

Additionally, the coolant recovered waste heat after exchanging heat with the battery 323 of the vehicle is cooled by exchanging heat with the refrigerant of low temperature and low pressure by the third expansion valve 318 while passing through the second chiller 316 along the second coolant line 325. In this instance, some of the coolant passing the battery 323 flows toward the second chiller 316, and the rest flows to the second low-temperature radiator 319 along the second branch line 321 to be cooled, and then, flows to the second coolant line 325 by the second valve 322 to be circulated.

The coolant passing the second chiller 316 flows to the second coolant line 325 after passing the second water pump 326 by the second valve 322, and then, circulates the battery 323 by the third valve 324. In this instance, the dual cooling valve 500 and the third valve 324 open the second coolant line 325 and the third coolant line 501 so that the coolant flows between the second coolant line 325 and the third coolant line 501.

Finally, the coolant recovered waste heat by exchanging heat with the electronic components 110 along the third coolant line 501 flows into the second coolant line 325 by the third valve 324, is cooled by passing through the second chiller 316 and the second low-temperature radiator 319, and then, circulates the third coolant line 501 by the dual cooling valve 500.

FIG. 7 shows the fourth mode for performing thermal management using all of the first system 200, the third system 400, and the second system 300. Referring to FIG. 7, the first system 200 performs cooling of the electronic components 110 through the self-cooling structure.

Now, the operation of the third system 400 will be described. The refrigerant discharged from the first compressor 411 flows along the first refrigerant line 415 by passing the first condenser 412, the first expansion valve 413, and the first chiller 414 in order.

Moreover, the coolant flowing in the third coolant line 501 recovers waste heat by exchanging heat with the electronic components 110, and passes the heat reservoir 418 through the first coolant line 424. After that, by the first valve 420, some of the coolant flows to the first chiller 414, and the rest flows to the first low-temperature radiator 416 along the first branch line 421 to be cooled.

The coolant passing through the first chiller 414 is cooled by exchanging heat with the refrigerant of low temperature and low pressure to be cooled after passing the first expansion valve 413 in the first refrigerant line 415, and then, meets the coolant passing the first low-temperature radiator 416 and passes through the heater 422. In this instance, the coolant flows to the third coolant line 501 by the dual cooling valve 500.

Now, the operation of the second system 300 will be described. The refrigerant discharged from the second compressor 411 flows along the second refrigerant line 315 after passing the second condenser 312, the second expansion valve 313 and the evaporator 314 in order. In this instance, some of the refrigerant passing the second condenser 312 flows to the evaporator 314, and the rest flows to the second chiller 316 after passing the third expansion valve 318 long the third refrigerant line 317.

Moreover, the coolant recovered waste heat by exchanging heat with the battery 323 of the vehicle exchanges heat with the refrigerant of low temperature and low pressure by the third expansion valve 318 to be cooled after passing the second chiller 316 along the second coolant line 325. In this instance, some of the coolant passing the battery 323 flows toward the second chiller 316, and the rest flows to the second low-temperature radiator 319 along the second branch line 321 to be cooled, and then, flows to the second coolant line 325 by the second valve 322 to be circulated.

The coolant passing the second chiller 316 flows to the second coolant line 325 after passing the second water pump 326 by the second valve 322, and then, circulates the battery 323 by the third valve 324. In this instance, the dual cooling valve 500 and the third valve 324 open the second coolant line 325 and the third coolant line 501 so that the coolant flows between the second coolant line 325 and the third coolant line 501.

Finally, the coolant recovered waste heat by exchanging heat with the electronic components 110 along the third coolant line 501 flows into the second coolant line 325 by the third valve 324, is cooled by passing through the second chiller 316 and the second low-temperature radiator 319, and then, circulates the third coolant line 501 by the dual cooling valve 500.

As previously described, in the detailed description of the invention, having described the detailed exemplary embodiments of the invention, it should be apparent that modifications and variations can be made by persons skilled without deviating from the spirit or scope of the invention. Therefore, it is to be understood that the technical protective scope of the present invention should be defined by the technical idea of the attached claims.

The invention claimed is:

1. A thermal management system for a vehicle for cooling electronic components required for autonomous driving of the vehicle, the thermal management system comprising: a first module for cooling the electronic components through a self-cooling structure thereof; a second module for cooling the electronic components by using a refrigerant cycle for air-conditioning an interior of the vehicle; and a third module for cooling the electronic components by using the refrigerant cycle or a coolant cycle, the third module including a first refrigerant line configured as a flow passage of refrigerant, a first compressor for discharging the refrigerant in a gaseous state of high temperature and high pressure after inhaling and compressing the refrigerant, a first condenser for condensing the refrigerant by exchanging heat with the air, a first expansion valve for expanding the refrigerant, a first chiller for exchanging heat between the refrigerant and a coolant, and a first coolant line passing through the first chiller and configured as a flow passage of the coolant exchanging heat with the electronic components; wherein the electronic components are cooled by at least two modules among the first, second and third modules.

2. The thermal management system according to claim 1, wherein thermal management of the electronic components is performed by the first module and the third module.

3. The thermal management system according to claim 1, wherein thermal management of the electronic components is performed by the first module and the second module.

4. The thermal management system according to claim 1, wherein the coolant circulating the electronic components is cooled using a cooling heat source of the second module, and wherein the third module and the second module interlock with each other to selectively cool the coolant circulating the electronic components.

5. The thermal management system according to claim 2, wherein the second module aids the first module and the third module to selectively cool the coolant circulating the electronic components.

6. The thermal management system according to claim 1, further comprising:
a sensor for detecting an external condition of at least two modules selected among the first module, the second module, and the third module; and
a communication line for performing communication between at least two modules selected among the first module, the second module, and the third module.

7. The thermal management system according to claim 6, wherein among at least two of the modules selected among the first module, the second module, and the third module, when one module fails, it is detected and the other module performs thermal management of the electronic components.

8. The thermal management system according to claim 7, wherein the sensor for detecting the external condition is a temperature sensor.

9. The thermal management system according to claim 6, further comprising:
a temperature control head for sensing a state of the second module and controlling an operation of the second module; and
a stand-alone controller for sensing a state of the third module and controlling the operation of the third module,
wherein sensing lines of the temperature control head and the stand-alone controller interlock with each other.

10. The thermal management system according to claim 1, wherein the first module cools the electronic components using at least one among radiation of heat, conduction, and convection current.

11. The thermal management system according to claim 10, wherein the third module further comprises a heater disposed in the first coolant line to heat the coolant.

12. The thermal management system according to claim 10, wherein the third module further comprises: a first branch line branching off from the first coolant line and bypassing the first chiller; and a first low-temperature radiator disposed in the first branch line to exchange heat between the air and the coolant.

13. The thermal management system according to claim 10, wherein the second module comprises:
a second refrigerant line which is a flow passage of the refrigerant;
a second compressor for discharging the refrigerant in a gaseous state of high temperature and high pressure after inhaling and compressing the refrigerant;
a second condenser for condensing the refrigerant by exchanging heat with the air;
an expansion means for expanding the refrigerant;
an evaporator disposed inside an air-conditioning case to exchange heat between the refrigerant and the air discharged to the interior of the vehicle;
a third refrigerant line bypassing the evaporator;
a second chiller disposed in the third refrigerant line to exchange heat between the refrigerant and the coolant; and
a second coolant line, which is a flow passage of the coolant exchanging heat with the electronic components and passes the second chiller.

14. The thermal management system according to claim 12, wherein the second module further comprises: a second branch line branching off from the second coolant line and bypassing the second chiller; and a second low-temperature radiator disposed in the second branch line to exchange heat between the air and the coolant.

15. A thermal management system for a vehicle for cooling electronic components required for autonomous driving of the vehicle, the thermal management system comprising: a first module for cooling the electronic components through a self-cooling structure thereof and including a first coolant line; a second module for cooling the electronic components by using a refrigerant cycle for air-conditioning an interior of the vehicle and including a second coolant line; a third module for cooling the electronic components by using the refrigerant cycle or a coolant cycle; a third coolant line, connected to the first coolant line and the second coolant line and configured as a flow passage of a coolant exchanging heat with the electronic components; and a dual cooling valve for selectively connecting the third coolant line to the first coolant line and the second coolant line, wherein the electronic components are cooled by at least two modules among the first, second and third modules.

* * * * *